United States Patent
Bossmann et al.

(10) Patent No.: US 10,570,742 B2
(45) Date of Patent: Feb. 25, 2020

(54) GAS TURBINE PART AND METHOD FOR MANUFACTURING SUCH GAS TURBINE PART

(71) Applicant: ANSALDO ENERGIA IP UK LIMITED, London (GB)

(72) Inventors: Hans-Peter Bossmann, Lauchringen (DE); Maryam Bharaini Hasani, Lupfig (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 597 days.

(21) Appl. No.: 15/349,440

(22) Filed: Nov. 11, 2016

(65) Prior Publication Data
US 2017/0138199 A1 May 18, 2017

(30) Foreign Application Priority Data
Nov. 12, 2015 (EP) ..................................... 15194212

(51) Int. Cl.
*F01D 5/08* (2006.01)
*F01D 25/00* (2006.01)
(Continued)

(52) U.S. Cl.
CPC ............ *F01D 5/08* (2013.01); *C04B 35/5615* (2013.01); *C04B 35/5618* (2013.01);
(Continued)

(58) Field of Classification Search
CPC ........ F01D 5/08; F01D 11/001; F01D 25/005; F05D 2220/32; F05D 2230/237; F05D 2230/60; F05D 2300/10; F05D 2300/20
(Continued)

(56) References Cited

U.S. PATENT DOCUMENTS 6,640,546 B2 * 11/2003 Lee .......................... F01D 5/186
60/752
8,192,850 B2   6/2012 Brinley
(Continued)

FOREIGN PATENT DOCUMENTS

EP   1 079 070 A2   2/2001
EP   2 894 139 A1   7/2015
(Continued)

OTHER PUBLICATIONS

European Search Report dated Apr. 18, 2016 by the European Patent Office for Application No. 15194212.5.
(Continued)

*Primary Examiner* — Aaron R Eastman
(74) *Attorney, Agent, or Firm* — Buchanan Ingersoll & Rooney PC

(57) ABSTRACT

The present disclosure relates to a gas turbine part, which can be exposed to high temperatures and centrifugal forces within a gas turbine. The gas turbine part can include plural sliced parts, wherein at least one of said sliced parts is made from a ternary ceramic called MAX phase, having the formula $M_{n+1}AX_n$, where n=1, 2, or 3, M is an early transition metal such as Ti, V, Cr, Zr, Nb, Mo, Hf, Sc, Ta, and A is an A-group element such as Al, Si, P, S, Ga, Ge, As, Cd, In, Sn, Tl, Pb, and X is C and/or N.

17 Claims, 3 Drawing Sheets

(51) Int. Cl.
*C04B 35/80* (2006.01)
*C04B 35/56* (2006.01)
*C04B 37/00* (2006.01)
*F01D 11/00* (2006.01)

(52) U.S. Cl.
CPC .......... *C04B 35/806* (2013.01); *C04B 37/006* (2013.01); *F01D 11/001* (2013.01); *F01D 25/005* (2013.01); *C04B 2235/77* (2013.01); *C04B 2235/80* (2013.01); *C04B 2235/81* (2013.01); *C04B 2235/96* (2013.01); *C04B 2235/9607* (2013.01); *C04B 2237/12* (2013.01); *C04B 2237/36* (2013.01); *C04B 2237/38* (2013.01); *C04B 2237/58* (2013.01); *C04B 2237/76* (2013.01); *F05D 2220/32* (2013.01); *F05D 2230/237* (2013.01); *F05D 2230/60* (2013.01); *F05D 2300/10* (2013.01); *F05D 2300/20* (2013.01)

(58) Field of Classification Search
USPC .......................................................... 416/95
See application file for complete search history.

(56) References Cited

U.S. PATENT DOCUMENTS

| | | | |
|---|---|---|---|
| 2002/0155316 A1 | 10/2002 | Zheng | |
| 2005/0197713 A1* | 9/2005 | Catlin | A61L 27/10 623/23.56 |
| 2006/0088435 A1* | 4/2006 | Gupta | C04B 35/56 419/13 |
| 2007/0023109 A1* | 2/2007 | Bewlay | C22C 27/02 148/442 |
| 2010/0055492 A1 | 3/2010 | Barsoum et al. | |
| 2011/0104464 A1* | 5/2011 | Pyzik | C04B 35/5615 428/218 |
| 2011/0143162 A1 | 6/2011 | Merrill et al. | |
| 2012/0301312 A1 | 11/2012 | Berczik et al. | |
| 2013/0052077 A1* | 2/2013 | Hardy | C22C 19/056 420/443 |
| 2013/0052438 A1 | 2/2013 | Hu et al. | |
| 2013/0108823 A1* | 5/2013 | Beraud | B29C 70/086 428/107 |
| 2013/0160466 A1* | 6/2013 | Sato | C22C 19/055 60/805 |
| 2014/0162130 A1* | 6/2014 | Barsoum | C01B 21/06 429/231.8 |
| 2015/0199952 A1 | 7/2015 | Amini et al. | |
| 2015/0285144 A1* | 10/2015 | Todorovic | F02C 7/045 137/15.1 |
| 2015/0361825 A1 | 12/2015 | Amini et al. | |
| 2016/0024955 A1 | 1/2016 | Amini et al. | |
| 2016/0319135 A1* | 11/2016 | Hecht | B64C 11/205 |
| 2016/0327059 A1* | 11/2016 | Amini | F01D 5/28 |
| 2017/0009600 A1* | 1/2017 | Grasso | F01D 5/189 |

FOREIGN PATENT DOCUMENTS

| | | |
|---|---|---|
| EP | 2 905 271 A1 | 8/2015 |
| WO | WO 2014/143266 A1 | 9/2014 |
| WO | WO 2014/149097 A2 | 9/2014 |
| WO | WO 2015/080839 A1 | 6/2015 |

OTHER PUBLICATIONS

European Search Report dated Apr. 18, 2016, by the European Patent Office for Application No. 15194211.7.
James L. Smialek et al., "Interfacial Reactions of a Max Phase/Superalloy Hybrid", Surface and Interface Analysis, vol. 47, No. 8, Jun. 29, 2015, pp. 844-853, XP055264586.
Miladin Radovic et al., "Max Phases: Bridging the Gap Between Metals and Ceramics", American Ceramic Society, Apr. 2013, vol. 92, No. 3, pp. 20-27.

* cited by examiner

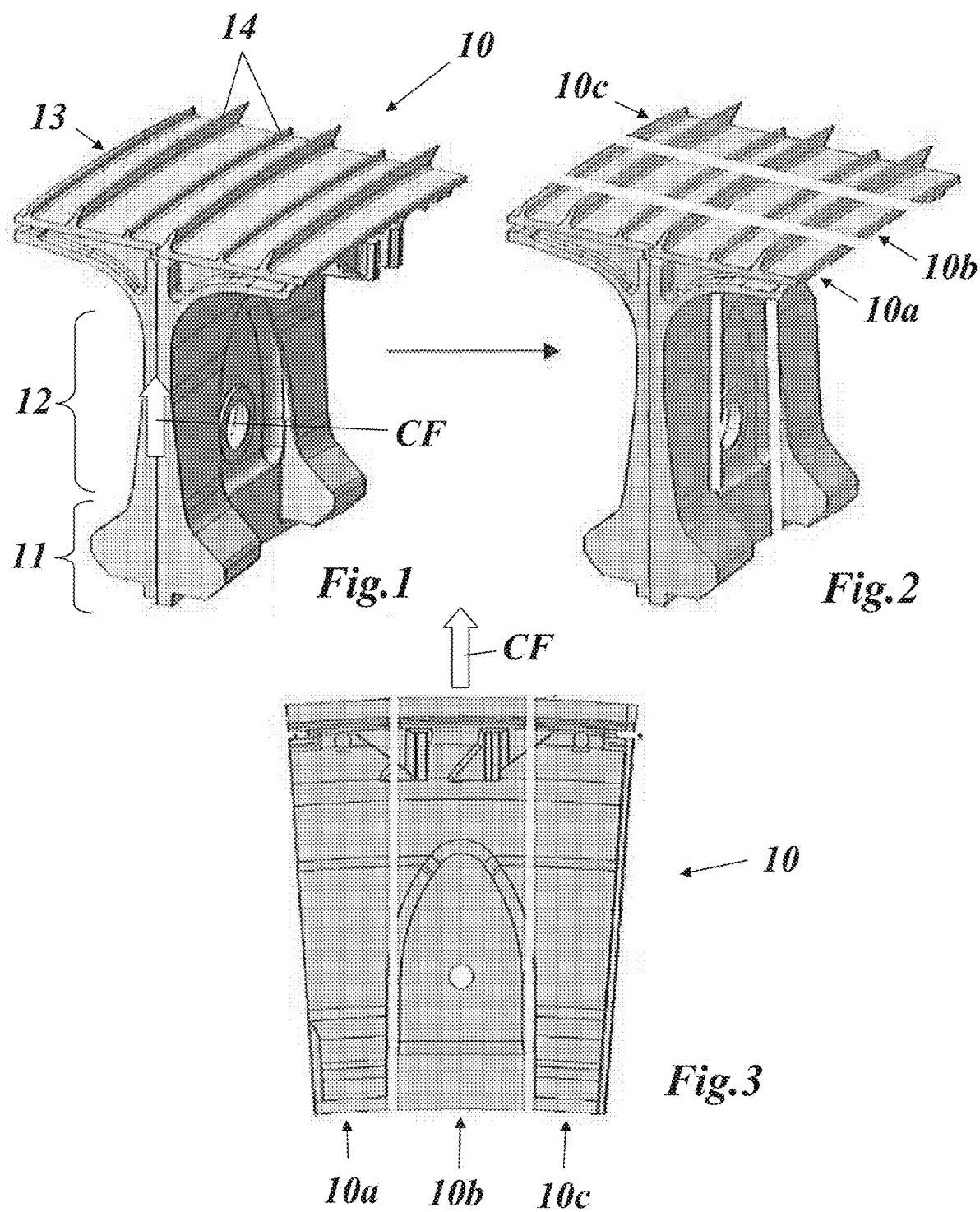

GAS TURBINE PART AND METHOD FOR MANUFACTURING SUCH GAS TURBINE PART

BACKGROUND OF THE INVENTION

The present invention relates to the technology of gas turbines. It refers to a gas turbine part according to the preamble of claim 1.

It further refers to a method for manufacturing such gas turbine part.

PRIOR ART

Today, high efficiency gas turbines operate with very high hot gas temperatures. The actual materials for hot gas turbine parts are nickel super alloys with density of about 8 g/cm$^3$. This relative high density causes high centrifugal forces on various rotor parts, e.g. blades. This problem gets worse, when gas turbines become larger On the other hand, ternary ceramics, so called MAX phases, are known, which can have low density of about 4 g/cm$^3$.

Particulars of the material are for example published in an article of M. Radovic and M. W. Barsoum, MAX phases: Bridging the gap between metals and ceramics, American Ceramic Society Bulletin, Vol. 92, Nr. 3, p. 20-27 (April 2013).

Document US 2010/0055492 A1 discloses compositions comprising a MAX phase material having the formula $M_{n+1}AX_n$, wherein M is an early transition metal, A is an A-group element, X one or both of C and N, and n=1-3, wherein the MAX phase material defines a plurality of pores; and, a metal component comprising a low melting point metal, wherein the metal occupies at least some of the pores. Also disclosed are method comprising providing a porous green body comprising a particulate material having the formula $M_{n+1}AX_n$, wherein M is an early transition metal, A is an A-group element, X one or both of C and N, and n=1-3; and, infiltrating at least some of the pores of the green body with a low melting point metal, thereby providing a composite material.

In the past, the use of MAX phases in the technical field of gas turbines has been considered.

Document U.S. Pat. No. 8,192,850 B2 discloses a combustion turbine component including a combustion turbine component substrate and a bond coating on the combustion turbine component substrate. The bond coating may include $M_{n+1}AX_n$ (n=1,2,3) where M is selected from groups IIIB, IVB, VB, VIB, and VII of the periodic table of elements and mixtures thereof, where A is selected from groups IIIA, IVA, VA, and VIA of the periodic table of elements and mixtures thereof, and where X includes at least one of carbon and nitrogen. A thermal barrier coating may be on the bond coating.

Document WO 2014/149097 A2 discloses a turbine engine system including a turbine engine component having an airfoil portion and a tip, which turbine engine component has a MAXMET composite bonded to the tip. The MAXMET composite has MAX phases in a metal matrix.

Document WO 2014/143266 A1 describes a vibration resistant fan guide vane for a gas turbine engine. The fan guide vane comprises a vibration-damping component made of a MAXMET composite. The damping component may be a cover that covers some or all of the fan guide vane body. Alternatively, portions of the fan guide vane body or the entire vane body may be made from MAXMET composites. The disclosure makes use of the ultrahigh, fully reversible, non-linear elastic hysteresis behavior that MAXMET composites exhibit during cyclic elastic deformation in order to damp vibration.

Document EP 2 905 271 A1 refers to a ceramic matrix composite CMC comprising ceramic fibers embedded in a ceramic matrix. The fibers comprise a coating made of a MAX phase. The MAX phase coating can be arranged direct on the surface of the fiber or for example between additional coating layers. The properties of the CMC are improved, preferable the high-temperature capabilities.

SUMMARY OF THE INVENTION

It is an object of the present invention to enable very large gas turbines without changing rotor materials.

It is another object of the invention to provide the application of new materials for gas turbines and new processes for manufacturing their components with reduced specific density and robust mechanical strength.

These and other objects are obtained by a gas turbine part according to Claim 1 and a method according to Claim 10.

The gas turbine part according to the invention, which is especially exposed to high temperatures and centrifugal forces within a gas turbine, is characterized in that said gas turbine part comprises a plurality of sliced parts, wherein at least one of said sliced parts is made from a ternary ceramic called MAX phase, having the formula $M_{n+1}AX_n$, where n=1, 2, or 3, M is an early transition metal such as Ti, V, Cr, Zr, Nb, Mo, Hf, Sc, Ta, and A is an A-group element such as Al, Si, P, S, Ga, Ge, As, Cd, In, Sn, Tl, Pb, and X is C and/or N, whereby M is in the range of 40-60 at-%, A is in the range of 10-30 at-% and X is in the range of 20-40 at-%, and whereby M+A+X is in the range of 80-100% with 0-20% being other elements which are not listed above and are result of impurities or oxidation, and wherein said sliced parts are joined.

According to an embodiment of the invention said sliced parts are joined by bolting, brazing and interlocking or combination of these to fix said sliced parts.

According to another embodiment of the invention said MAX phase is single phase $Ti_2AlC$ or a composition of two phases, $Ti_2AlC$ and $Ti_3AlC_2$, where the range of the $Ti_2AlC$ phase is 60-95%.

According to just another embodiment of the invention said MAX phase is single phase $Ti_3SiC_2$ or a composition of two phases, $Ti_3SiC_2$ and $Ti_4SiC_3$, where the range of the $Ti_3SiC_2$ phase is 60-95%.

According to just another embodiment of the invention said MAX phase is a mixture of two main phases $Ti_3SiC_2$ and $Ti_2AlC$, where the range of the $Ti_3SiC_2$ phase is 40-90%, and whereby two MAX phases are in the range of 50-100% with 0-20% being other MAX phases or elements.

According to a further embodiment of the invention said gas turbine part has anisotropic material properties by combining several sliced parts with different crystalline orientation.

In one of the sliced parts a crystalline orientation may be in direction of centrifugal force, and in another one of the sliced parts a crystalline orientation may be perpendicular to the direction of centrifugal force.

According to another embodiment of the invention said gas turbine part has anisotropic material properties by combining several sliced parts with fibers in different orientations.

According to another embodiment of the invention said gas turbine part is a rotor heat shield.

The inventive method comprises the steps of.
a) providing a ternary ceramic called MAX phase, having the formula $M_{n+1}AX_n$, where n=1, 2, or 3, M is an early transition metal such as Ti, V, Cr, Zr, Nb, Mo, Hf, Sc, Ta, and A is an A-group element such as Al, Si, P, S, Ga, Ge, As, Cd, In, Sn, Tl, Pb, and X is C and/or N, whereby M is in the range of 40-60 at-%, A is in the range of 10-30 at-% and X is in the range of 20-40 at-%, and whereby M+A+X is in the range of 80-100% with 0-20% being other elements which are not listed above and are result of impurities or oxidation;
b) manufacturing a plurality of sliced parts, whereby at least one of said sliced parts is made from said MAX phase; and
c) joining said sliced parts to build said gas turbine part.

According to an embodiment of the inventive method said joining step c) comprises bolting, brazing and interlocking or combination of these to fix said sliced parts.

According to another embodiment of the inventive method sliced parts with different crystalline orientation are combined to get a gas turbine part with anisotropic material properties.

According to a further embodiment of the inventive method fibers are used to get a gas turbine part with anisotropic material properties.

BRIEF DESCRIPTION OF THE DRAWINGS

The present invention is now to be explained more closely by means of different embodiments and with reference to the attached drawings.

FIG. 1-3 show the subdivision of an exemplary rotor heat shield design of a gas turbine into three separate slices to be manufactured separately according to an embodiment of the invention;

DETAILED DESCRIPTION OF DIFFERENT EMBODIMENTS OF THE INVENTION

The invention is about producing a gas turbine part, especially rotor heat shield of gas turbine using new materials, design and processing, where new materials provide low density and therefore reduce centrifugal force on rotor, and new design and processing methods facilitate fabrication of the parts.

This allows building very large gas turbines without changing rotor materials. This can be done by application of new materials and processing to manufacture components with reduced specific density and robust mechanical strength.

In this connection, so-called MAX phases, ternary ceramics, are extremely interesting candidates that can fulfill this request, with density of about 4-4.5 g/cm$^3$, thermal expansion coefficient>$8 \times 10^{-6}$ K$^{-1}$, thermal conductivity>50 W/mK at 700° C., fracture toughness>5 MPa·m$^{1/2}$, and high oxidation resistance.

Figure 7:
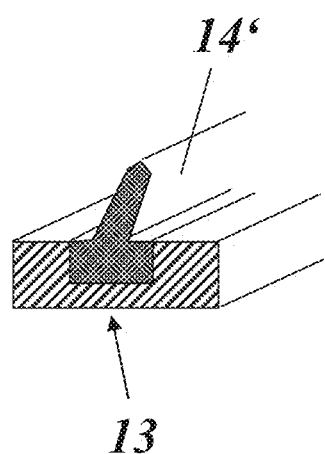
FIG. 7 shows a rotor heat shield with separate parts (fins) on the top of the heat shield, which are made of Max phases, and are inserted into a recess on top of the heat shield.

The proposed solution of using MAX phases will solve the oxidation problem, especially on fins 14' of a rotor heat shield 13, as shown in FIG. 7.

The MAX phases, which are used to produce hot turbine parts by powder metallurgy processes, are a family of ceramics having $M_{n+1}AX_n$ formula, where n=1, 2, or 3, M is an early transition metal such as Ti, V, Cr, Zr, Nb, Mo, Hf, Sc, Ta and A is an A-group element such as Al, Si, P, S, Ga, Ge, As, Cd, In, Sn, Tl, Pb and X is C and/or N. M is in the range of 40-60 at-%, A in the range of 10-30 at-% and X in the range of 20-40 at-%. And M+A+X is in the range of 80-100% and 0-20% elements, which are not listed above and are result of impurities or oxidation.

One preferred composition of MAX phase is single phase $Ti_2AlC$, or two phases, $Ti_2AlC$ and $Ti_3AlC_2$ (211 and 312), where the range of the 211 phase is 60-95%.

Another preferred composition of MAX phase is single phase $Ti_3SiC$, or two phases, $Ti_3SiC_2$ and $Ti_4SiC_3$ (312 and 413), where the range of the 312 phase is 60-95%.

Another preferred composition of MAX phase is a mixture of two main phases $Ti_3SiC_2$ and $Ti_2AlC$, where the range of the $Ti_3SiC_2$ phase is 40-90%, and whereby two MAX phases are in the range of 50-100% with 0-20% being other MAX phases or elements.

Especially, a rotor heat shield of gas turbine (the part) is produced from MAX phase by powder technology processes. A rotor heat shield is for example shown in FIG. 2 of document EP 1 079 070 A2.

FIG. 1 of the present application shows the design of a rotor heat shield 10, which is mounted on the rotor of a gas turbine to shield the rotor against the hot gas temperatures of the hot gas path. The T-shaped rotor heat shield 10 has a bottom part 11, which is in contact with the not shown root section of the rotor. A top part 13 with a plurality of parallel fins 14 on its upper side is in contact with the tips of the stationary vanes at the stator part of the turbine (not shown). Top part 13 and bottom part 11 are connected by an intermediate part 12. As the rotor heat shield 10 rotates with the rotor, it is subjected to a centrifugal force CF, the direction of which is marked by an arrow in FIG. 1 and FIG. 3.

The rotor heat shield 10 is (in the example shown in FIG. 1-3) subdivided into three separate sliced parts 10a, 10b and 10c along the direction of centrifugal force CF. Other subdivisions are possible. Of the three sliced parts 10a, 10b and 10c one, two or all parts are made from a MAX phase having $M_{n+1}AX_n$ formula, where n=1, 2, or 3, M is an early transition metal such as Ti, V, Cr, Zr, Nb, Mo, Hf, Sc, Ta and A is an A-group element such as Al, Si, P, S, Ga, Ge, As, Cd, In, Sn, Tl, Pb and X is C and/or N. M is in the range of 40-60 at-%, A in the range of 10-30 at-% and X in the range of 20-40 at-%. And M+A+X is in the range of 80-100% and 0-20% elements, which are not listed above and are result of impurities or oxidation.

Figure 4:
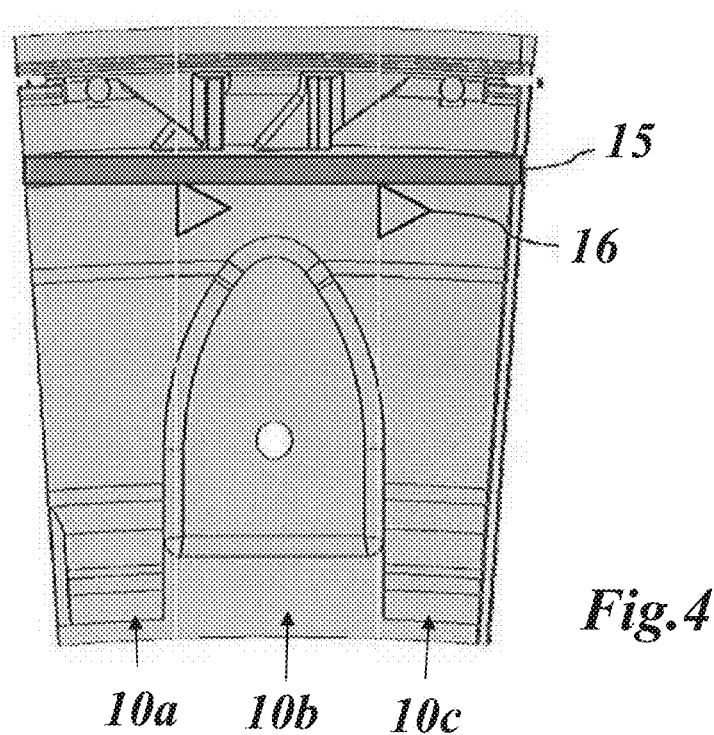
FIG. 4 shows a first example of how the slices are joined after being manufactured separately.
Figure 5:
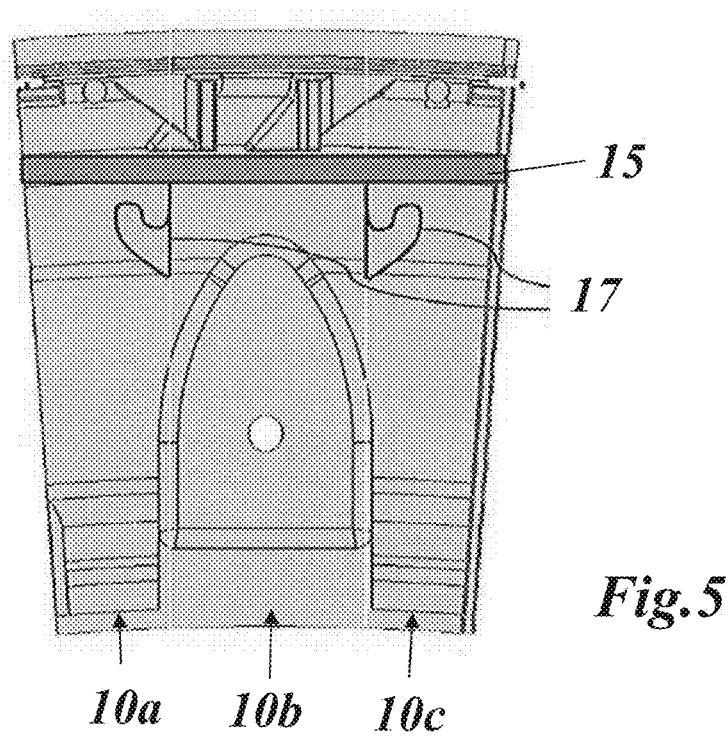
FIG. 5 shows a second example of how the slices are joined after being manufactured separately.

According to FIGS. 4 and 5 the sliced parts 10a, 10b and 10c are then joined by bolting, brazing, interlocking with a bolt 15 and respective interlocks 16 (FIG. 4) or 17 (FIG. 5), or combination of these is used to fix the parts.

Figure 6:
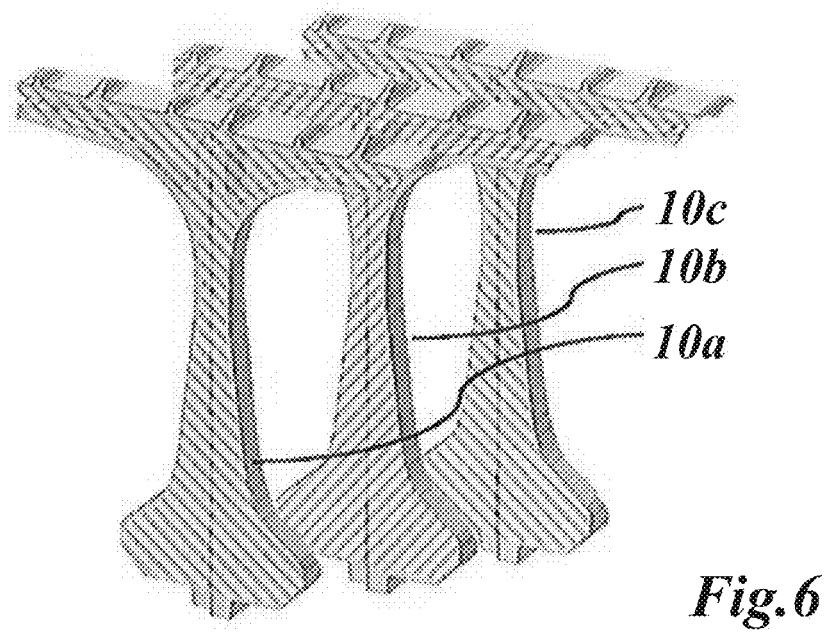
FIG. 6 shows slices similar to FIG. 2, with different crystalline orientation in order to achieve an anisotropic material.

As current rotor heat shields are usually bending due to thermo-mechanical load and heating and cooling of different mass distributions, it is further proposed to provide a rotor heat shield with anisotropic material produced from several sliced parts 10a, 10b and 10c (see FIG. 6), where in one sliced part a crystalline orientation is in the direction of centrifugal force, and in another sliced part a crystalline structure is perpendicular to the direction of centrifugal force. In FIG. 6, this different crystalline orientation is illustrated by a different hatching.

This is especially beneficial for a T-shaped rotor heat shield (including the top part 13 in contact with vane tip/shroud and the bottom part 11 in contact with the root section) where the top part 13 is not bending due to the combination of different orientations and the high thermal conductivity of the MAX phase.

Alternative to different crystalline orientation the anisotropic material properties are may be produced with immersed fibers of different orientation.

In addition, according to another embodiment, as shown in FIG. 7, separate parts (fins 14') on the top of the heat shield may be made of MAX phases, which fins 14' could be inserted into respective recesses on top of the heat shield 13.

LIST OF REFERENCE NUMERALS 10 rotor heat shield (T-shape)
10a-c sliced part
11 bottom part (in contact with root section)
12 intermediate part
13 top part (in contact with vane tip)
14, 14' fin
15 bolt
16, 17 interlock
CF centrifugal force

The invention claimed is:

1. A gas turbine part configured for exposure to heat and centrifugal forces within a gas turbine, wherein said gas turbine part comprises:
a plurality of joined sections, wherein at least one of said joined sections is made from a ternary ceramic called MAX phase, having a formula $M_{n+1}AX_n$, where n=1, 2, or 3, M is an early transition metal selected from a group which includes Ti, V, Cr, Zr, Nb, Mo, Hf, Sc, Ta, and A is an A-group element selected from a group which includes Al, Si, P, S, Ga, Ge, As, Cd, In, Sn, Tl, Pb, and X is C and/or N, whereby M is in a range of 40-60 at-%, A is in a range of 10-30 at-% and X is in a range of 20-40 at-%, and whereby M+A+X is in a range of 80-100 at-x % with 0-20 at-x % being elements other than those already listed and are a result of impurities or oxidation.

2. The gas turbine part as claimed in claim 1, comprising:
a bolt, a brazed joint, an interlock or a combination of these joints between said joined sections.

3. The gas turbine part as claimed in claim 1, wherein said MAX phase is single phase $Ti_2AlC$ or a composition of two phases, $Ti_2AlC$ and $Ti_3AlC_2$, where a range of the $Ti_2AlC$ phase is 60-95 at-%.

4. The gas turbine part as claimed in claim 1, wherein said MAX phase is single phase $Ti_3SiC_2$ or a composition of two phases, $Ti_3SiC_2$ and $Ti_4SiC_3$, where a range of the $Ti_3SiC_2$ phase is 60-95 at-%.

5. The gas turbine part as claimed in claim 1, wherein said MAX phase is a mixture of two main phases $Ti_3SiC_2$ and $Ti_2AlC$, where a range of the $Ti_3SiC_2$ phase is 40-90 at-%, and whereby two MAX phases are in a range of 50-100 at-% with 0-20 at-% being other MAX phases or elements.

6. The gas turbine part as claimed in claim 1, wherein said gas turbine part possesses anisotropic material properties by combining several sections with different crystalline orientation.

7. The gas turbine part as claimed in claim 6, wherein in one of the sections a crystalline orientation is in a direction of intended centrifugal force, and in another one of the sections a crystalline orientation is perpendicular to the direction of centrifugal force.

8. The gas turbine part as claimed in claim 1, wherein said gas turbine part possesses anisotropic material properties by combining several sections with fibers in different orientations.

9. The gas turbine part as claimed in claim 1, wherein said gas turbine part is a rotor heat shield.

10. The gas turbine part as claimed in claim 1 wherein the part is a rotor heat shield, vane tip/shroud, vane and root section.

11. The gas turbine part as claimed in claim 1 wherein the plurality of sections have joints arranged in a radial direction.

12. Method A method for manufacturing a gas turbine part, the method comprising:
a) providing a ternary ceramic called MAX phase, having a formula $M_{n+1}AX_n$, where n=1, 2, or 3, M is an early transition metal selected from a group which includes Ti, V, Cr, Zr, Nb, Mo, Hf, Sc, Ta, and A is an A-group element selected from a group which includes Al, Si, P, S, Ga, Ge, As, Cd, In, Sn, Tl, Pb, and X is C and/or N, whereby M is in a range of 40-60 at-%, A is in a range of 10-30 at-% and X is in a range of 20-40 at-%, and whereby M+A+X is in a range of 80-100 at-% with 0-20 at-% being elements other than those already listed and are a result of impurities or oxidation;
b) manufacturing a plurality of sections, whereby at least one of said sections is made from said MAX phase; and
c) joining said sections to build said gas turbine part.

13. The method as claimed in claim 12, wherein said joining step c) comprises:
bolting, brazing and interlocking or combination of these to fix said sections.

14. The method as claimed in claim 12, comprising:
combining sections with different crystalline orientation to produce a gas turbine part with anisotropic material properties.

15. The method as claimed in claim 12, comprising:
using fibers to produce a gas turbine part with anisotropic material properties.

16. The method as claimed in claim 12 wherein the part is a rotor heat shield, vane tip/shroud, vane and root section.

17. The method as claimed in claim 12 wherein the plurality of sections have joints arranged in a radial direction.

* * * * *